United States Patent
Sawada et al.

(10) Patent No.: US 8,108,099 B2
(45) Date of Patent: Jan. 31, 2012

(54) PNEUMATIC TIRE INTERNAL PRESSURE CONTROL DEVICE FOR VEHICLE, VEHICLE, AND ITS CONTROL METHOD

(75) Inventors: Hiroki Sawada, Kodaira (JP); Yasumichi Wakao, Musashino (JP)

(73) Assignee: Bridgestone Corporation, Tokyo (JP)

( * ) Notice: Subject to any disclaimer, the term of this patent is extended or adjusted under 35 U.S.C. 154(b) by 618 days.

(21) Appl. No.: 12/280,281

(22) PCT Filed: Feb. 20, 2007

(86) PCT No.: PCT/JP2007/053086
§ 371 (c)(1),
(2), (4) Date: Nov. 10, 2008

(87) PCT Pub. No.: WO2007/105427
PCT Pub. Date: Sep. 20, 2007

(65) Prior Publication Data
US 2010/0235044 A1  Sep. 16, 2010

(30) Foreign Application Priority Data
Feb. 23, 2006  (JP) ................................ P2006-047290

(51) Int. Cl.
*G01M 17/02* (2006.01)
(52) U.S. Cl. ..................... 701/36; 152/331.1; 152/339.1; 152/342.1; 701/31
(58) Field of Classification Search .................... 701/36, 701/31, 29; 340/442, 443, 444; 152/510, 152/511, 517, 518, 519, 209.11, 331.1, 338.1, 152/453, 339.1, 342.1, 454; 73/146, 416.2, 73/146.3, 146.4, 146.5
See application file for complete search history.

(56) References Cited

U.S. PATENT DOCUMENTS

| | | | | |
|---|---|---|---|---|
| 2,223,007 A | * | 11/1940 | Legowsky et al. | 152/342.1 |
| 2,998,996 A | * | 9/1961 | Aghnides | 301/41.1 |
| 3,616,831 A | * | 11/1971 | LaFuente, et al | 152/342.1 |
| 5,568,830 A | * | 10/1996 | Polsinelli et al. | 152/404 |
| 6,615,888 B2 | * | 9/2003 | Elkow | 152/342.1 |
| 7,032,441 B2 | * | 4/2006 | Kanatani et al. | 73/146 |
| 7,224,268 B2 | * | 5/2007 | Sekizawa | 340/442 |
| 7,520,354 B2 | * | 4/2009 | Morrow et al. | 180/65.31 |
| 7,522,979 B2 | * | 4/2009 | Pillar | 701/33 |

(Continued)

FOREIGN PATENT DOCUMENTS
EP  1044828 A1  10/2000
(Continued)

OTHER PUBLICATIONS

Kanii, Takao JP 2005-041257 Publication Date Feb. 17, 2005, Computer translation.*

(Continued)

*Primary Examiner* — Ruth Ilan
*Assistant Examiner* — Karen A Beck
(74) *Attorney, Agent, or Firm* — Sughrue Mion, PLLC

(57) ABSTRACT

A pneumatic tires (20FL, 20FR, 20RL, 20RR) each having a plurality of air chambers disposed therein along a tread width direction. An internal pressure control device (100) includes a sensor unit (120) configured to inform a controller (110) that the four-wheel automobile (10) is going as being displaced in the leftward or rightward direction; and the controller (110) configure to change the internal pressures of the plurality of air chambers on the basis of the instruction outputted from the sensor unit (120).

17 Claims, 8 Drawing Sheets

U.S. PATENT DOCUMENTS

| | | | |
|---|---|---|---|
| 7,677,095 B1* | 3/2010 | Bartol | 73/146.2 |
| 7,715,962 B2* | 5/2010 | Rowe et al. | 701/36 |
| 7,784,512 B2* | 8/2010 | Sawada | 152/331.1 |
| 2002/0023700 A1* | 2/2002 | Caretta | 152/539 |
| 2004/0154715 A1* | 8/2004 | Dufournier | 152/154.2 |
| 2005/0113988 A1* | 5/2005 | Nasr et al. | 701/22 |
| 2005/0172707 A1* | 8/2005 | Kanatani et al. | 73/146 |
| 2005/0235744 A1* | 10/2005 | Ogawa | 73/146 |
| 2005/0279438 A1* | 12/2005 | Onracek | 152/209.11 |
| 2006/0086183 A1* | 4/2006 | Tatraux-Paro et al. | 73/146 |
| 2009/0112389 A1* | 4/2009 | Yamamoto et al. | 701/29 |
| 2010/0235044 A1* | 9/2010 | Sawada et al. | 701/36 |

FOREIGN PATENT DOCUMENTS

| | | |
|---|---|---|
| JP | 03281405 | 12/1991 |
| JP | 2000-190701 A | 7/2000 |
| JP | 2003-039914 A | 2/2003 |
| JP | 2005-041257 A | 2/2005 |

OTHER PUBLICATIONS

European Search Report issued in Application No. 07714589.4 dated Oct. 5, 2011.

* cited by examiner

PNEUMATIC TIRE INTERNAL PRESSURE CONTROL DEVICE FOR VEHICLE, VEHICLE, AND ITS CONTROL METHOD

TECHNICAL FIELD

The present invention relates to a pneumatic tire internal pressure control device, a vehicle and its control method.

More particularly, the present invention relates to a pneumatic tire internal pressure control device and a pneumatic tire internal pressure control method for controlling internal pressures of a plurality of air chambers in a state where pneumatic tires are mounted on a vehicle, the pneumatic tires having the plurality of air chambers disposed therein along a tread width direction. Moreover, the present invention also relates to a vehicle equipped with the pneumatic tire internal pressure control device.

BACKGROUND ART

There has heretofore been known a pneumatic tire having a plurality of air chambers (for example, three air chambers) therein along a tread width direction of the pneumatic tire (for example, Patent Document 1).

Even if such a pneumatic tire is damaged (punctured, for example), a load exerted on the pneumatic tire can be supported by the air chambers other than the damaged air chamber. Thus, a vehicle (specifically, a four-wheel automobile) can run a certain distance even when the pneumatic tire is damaged. Patent Document 1: Japanese Patent Application Publication No. 2003-39914 (Page 3, FIG. 1)

DISCLOSURE OF INVENTION

The study on the pneumatic tire described above by the inventors of the present application has found out that maneuverability of the vehicle (for example, a traveling direction or a minimum turning radius of the vehicle) can be controlled by dynamically changing an internal pressure of each of the air chambers while the vehicle is running.

The present invention has been made in consideration of the above circumstances. It is an object of the present invention to provide a pneumatic tire internal pressure control device, a vehicle and its control method, which are capable of controlling maneuverability of the vehicle by use of pneumatic tires having a plurality of air chambers disposed therein along a tread width direction.

A first aspect of the present invention is a pneumatic tire internal pressure control device for a vehicle, including: pneumatic tires each having a plurality of air chambers disposed therein along a tread width direction; an internal pressure controller configured to control internal pressures of the plurality of air chambers; and an instruction unit configured to give the internal pressure controller to change the internal pressures on the basis of a running state of the vehicle.

According to the above pneumatic tire internal pressure control device, the internal pressures of the plurality of air chambers are controlled on the basis of a state where the vehicle is going as being displaced in the leftward or rightward direction.

When the pneumatic tires are rotated in a state where the internal pressures of the plurality of air chambers are different from each other, lateral force (simulated camber thrust) is generated along a direction from the low-pressure air chamber side to the high-pressure air chamber side. Thus, the vehicle can be controlled to be displaced in the rightward or leftward direction.

Here, the instruction unit may indicate that the vehicle is going as being displaced in the leftward or rightward direction.

Furthermore, the instruction unit may include a selection operation unit configured to allow a driver or a passenger of the vehicle to select the instruction, and gives the internal pressure controller the instruction on the basis of a selection by the selection operation unit.

The instruction unit may include a running lane maintenance monitoring unit configured to monitor whether or not the vehicle is running within a predetermined running lane and give the internal pressure controller the instruction on the basis of a monitoring by the running lane maintenance monitoring unit.

Here, it is preferable that, when the vehicle has deviated or is going to deviate from the predetermined running lane, the running lane maintenance monitoring unit monitors a deviation direction indicating in which direction, the leftward direction or the rightward direction, the vehicle deviates from the predetermined running lane. Furthermore, it is preferable that the internal pressure controller sets the internal pressure of the air chamber in each pneumatic tire positioned on the side opposite to the monitored deviation direction to be higher than the internal pressure of the air chamber in each pneumatic tire positioned on the deviation direction side.

The instruction unit may include a steering state detection unit configured to detect a state related to steering of the vehicle and the internal pressure controller may change the internal pressures of the plurality of air chambers on the basis of the state related to steering.

Here, it is preferable that the steering state detection unit detects a steering direction of the vehicle and the internal pressure controller sets the internal pressure of the air chamber positioned on the steering direction side to be higher than the internal pressure of the air chamber positioned on the side opposite to the steering direction in each of the pneumatic tires mounted on the front side of the vehicle.

Furthermore, the steering state detection unit may detect a steering direction of the vehicle, and the internal pressure controller may generate a difference in internal pressure between the air chamber positioned on the steering direction side and the air chamber positioned on the side opposite to the steering direction in each of the pneumatic tires mounted on the rear side of the vehicle.

It is preferable that the steering state detection unit detects that the vehicle is in an oversteer state and the internal pressure controller sets the internal pressure of the air chamber positioned on the steering direction side to be higher than the internal pressure of the air chamber positioned on the side opposite to the steering direction in each of rear pneumatic tires mounted on the rear side of the vehicle.

It is preferable that the steering state detection unit detects that the vehicle is in an oversteer state and the internal pressure controller sets the internal pressure of the air chamber positioned on the side opposite to the steering direction to be higher than the internal pressure of the air chamber positioned on the steering direction side in each of front pneumatic tires mounted on the front side of the vehicle.

It is preferable that the steering state detection unit detects that the vehicle is in an understeer state and the internal pressure controller sets the internal pressure of the air chamber positioned on the steering direction side to be higher than the internal pressure of the air chamber positioned on the side opposite to the steering direction in each of front pneumatic tires mounted on the front side of the vehicle.

It is preferable that the steering state detection unit detects that the vehicle is in an understeer state and the internal pressure controller sets the internal pressure of the air chamber positioned on the side opposite to the steering direction to be higher than the internal pressure of the air chamber positioned on the steering direction side in each of rear pneumatic tires mounted on the rear side of the vehicle.

It is preferable that the plurality of air chambers disposed along the tread width direction include a main air chamber positioned so as to have a part of its outer periphery included on a tire equator line of the pneumatic tire, an outer sub-air chamber positioned more distant from the vehicle than the main air chamber, and an inner sub-air chamber positioned closer to the vehicle than the main air chamber.

Here, a volume of at least one of the outer sub-air chamber and the inner sub-air chamber may be smaller than a volume of the main air chamber.

Furthermore, the internal pressure controller may generate a difference in internal pressure between the outer sub-air chamber and the inner sub-air chamber.

Moreover, the present invention may be a vehicle including the pneumatic tire internal pressure control device.

Moreover, a second aspect of the present invention is a method for controlling internal pressures of pneumatic tires for a vehicle, the pneumatic tire having a plurality of air chambers disposed therein along a tread width direction, the method including the steps of: instructing that the vehicle is going as being displaced in a leftward or rightward direction; and differentiating internal pressures of the plurality of air chambers on the basis of the instruction in the instructing step.

BRIEF DESCRIPTION OF THE DRAWINGS

FIG. 6 (b) is the same explanatory view as FIG. 6 (a), showing the case where the vehicle is going in a rightward direction D1R.

FIG. 9 (b) is the same explanatory view as FIG. 9 (a), showing the case where the internal pressure of each air chamber is controlled.

BEST MODE FOR CARRYING OUT THE INVENTION

Figure 1:
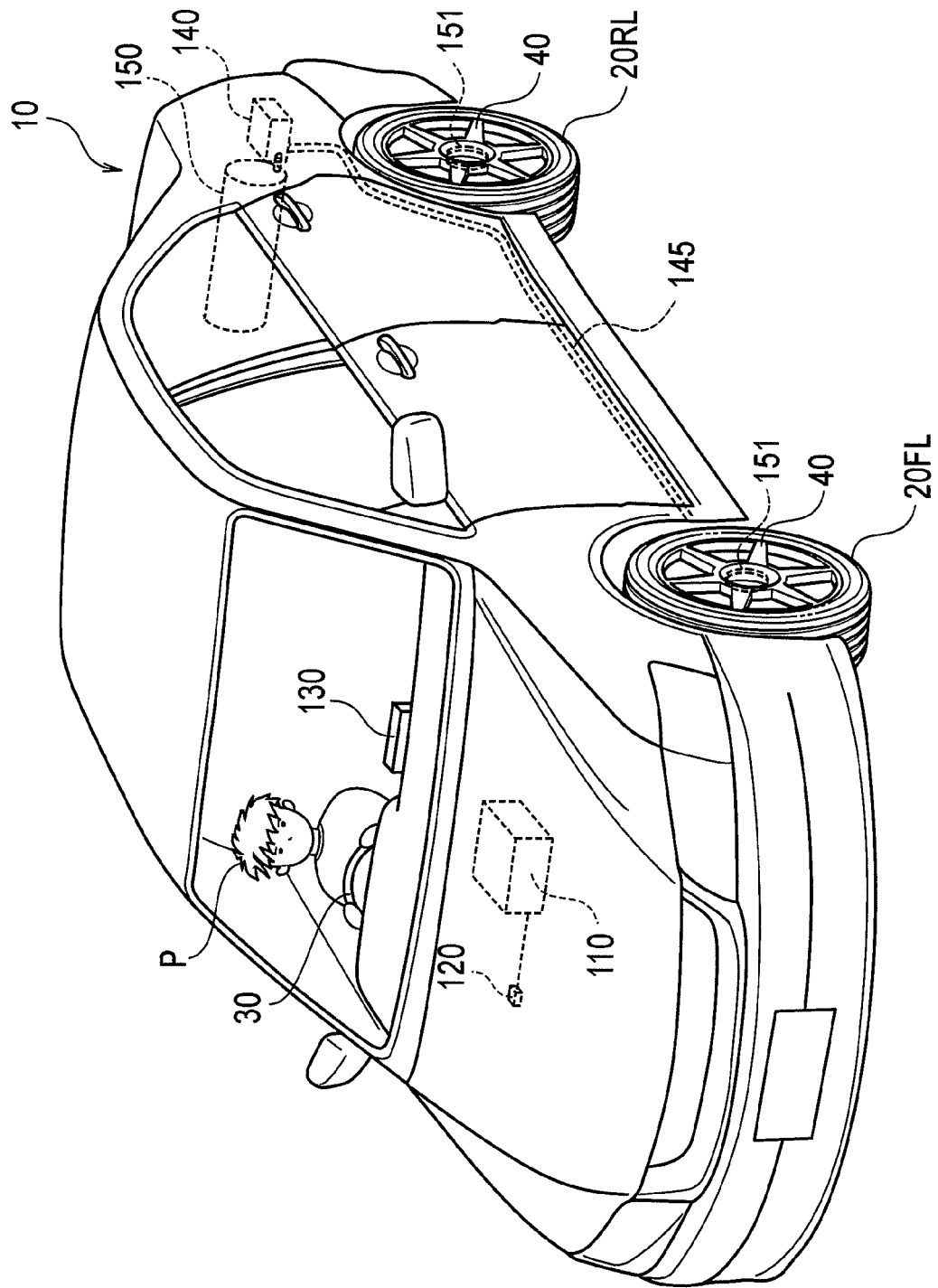
FIG. 1 is a schematic view showing an entire vehicle according to an embodiment of the present invention.

Next, embodiments of the present invention will be described with reference to the drawings. Note that, in the following description of the drawings, the same or similar parts will be denoted by the same or similar reference numerals. However, it should be noted that the drawings are schematic and ratios of dimensions and the like are different from actual ones.

Therefore, specific dimensions and the like should be determined in consideration of the following description. Moreover, as a matter of course, also among the drawings, there are included portions in which dimensional relationships and ratios are different from each other.

(Overall Configuration of Vehicle)

FIG. 1 is a schematic view showing an entire four-wheel automobile 10 that constitutes a vehicle in this embodiment. The four-wheel automobile 10 runs with an engine or a motor (not shown) as its power source.

The four-wheel automobile 10 includes pneumatic tires 20FL, 20FR, 20RL and 20RR attached to four wheels, specifically, rim wheels 40. Note that FIG. 1 does not show the pneumatic tires 20FR and 20RR which are mounted on the right side of the four-wheel automobile 10 (see FIG. 3).

The four-wheel automobile 10 includes a steering wheel 30. When a driver P turns the steering wheel 30, the pneumatic tires 20FL and 20FR are turned to the right or left in a traveling direction.

Moreover, the four-wheel automobile 10 includes a pneumatic tire internal pressure control device 100 (not shown in FIG. 1, see FIG. 3) which controls internal pressures of the pneumatic tires 20FL, 20FR, 20RL and 20RR (hereinafter appropriately abbreviated as the "pneumatic tires") that are mounted on the four-wheel automobile 10.

The pneumatic tire internal pressure control device 100 includes a controller 110, a sensor unit 120, an operation panel 130, a compressor 140, an air tank 150, rotary joints 151, RL and the like as shown in FIG. 1. Note that a specific configuration of the pneumatic tire internal pressure control device 100 will be described later.

The controller 110 controls the internal pressures of the pneumatic tires on the basis of a signal (instruction) outputted from the sensor unit 120, the operation panel 130 or the like.

The sensor unit 120 has a sensor for detecting a steering angle that is a rotation angle of the steering wheel 30, a sensor for detecting whether or not the four-wheel automobile 10 is running within a predetermined running lane, and the like.

The operation panel 130 is disposed on a dashboard (not shown). The operation panel 130 allows the driver P or a passenger of the four-wheel automobile 10 (hereinafter appropriately abbreviated as the "driver P") to select in which direction, leftward or rightward, to run the four-wheel automobile 10 by controlling the internal pressures of the pneumatic tires.

A compressed gas stored in the air tank 150 is sent to the pneumatic tires by the compressor 140. Specifically, the compressed gas sent from the air tank 150 is supplied to each of the pneumatic tires through air hoses 145 and the rotary joints 151, which are disposed on inner sides of the rim wheels 40 in a vehicle width direction.

(Configuration of Pneumatic Tire)

Figure 2:
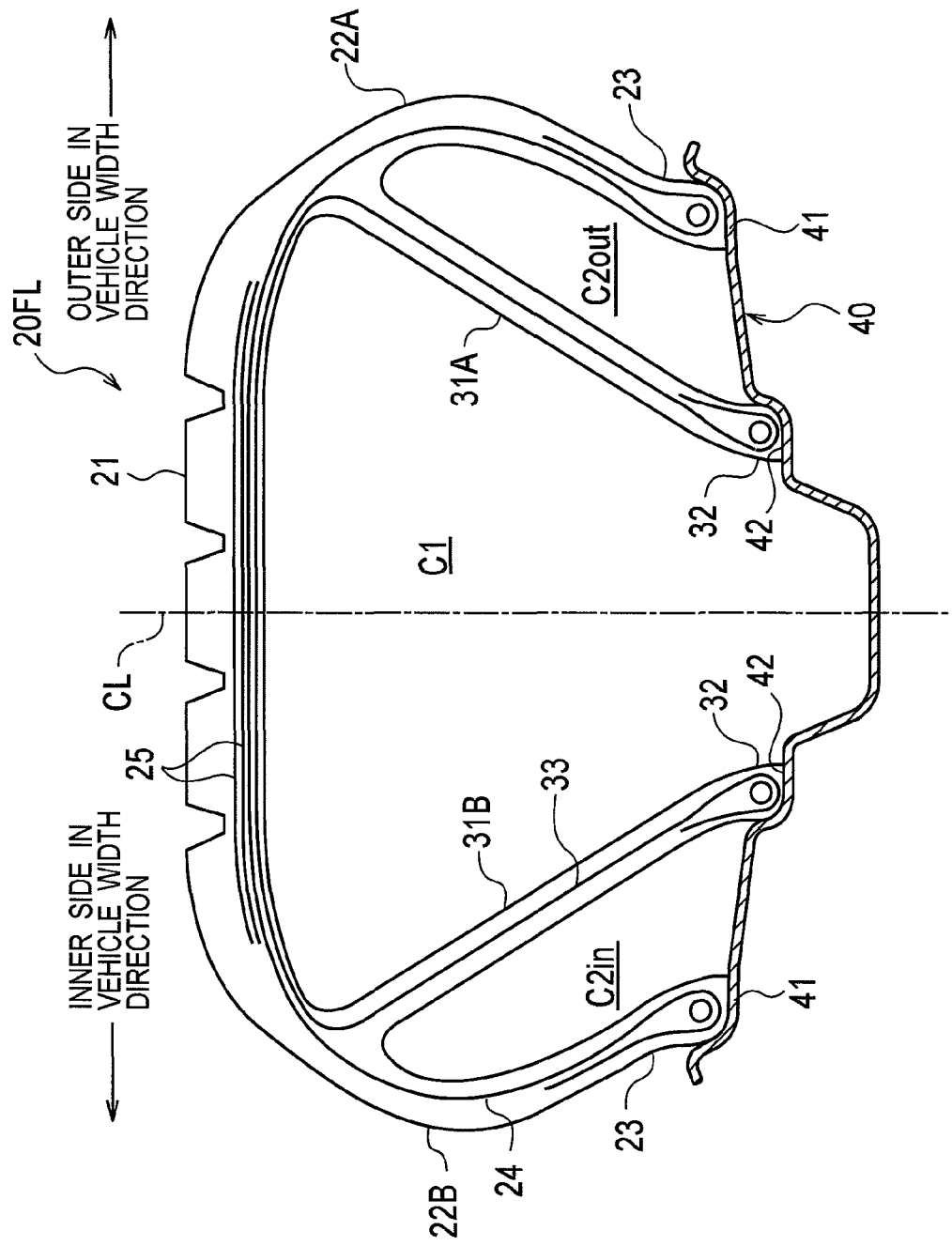
FIG. 2 is a cross-sectional view in a tread width direction of a pneumatic tire according to the embodiment of the present invention.

FIG. 2 is a cross-sectional view in a tread width direction of the pneumatic tire 20FL mounted at a front left position of the four-wheel automobile 10. Note that the pneumatic tires 20FR, 20RL and 20RR also have the same structure as that of the pneumatic tire 20FL.

As shown in FIG. 2, the pneumatic tire 20FL has a tread 21, sidewalls 22A and 22B and beads 23, as in the case of the conventional pneumatic tire. The beads 23 are locked by bead seats 41 of the rim wheel 40.

Moreover, the pneumatic tire 20FL has a carcass 24 that forms a frame structure of the pneumatic tire 20FL and a belt layer 25 for reinforcing the carcass 24.

The pneumatic tire 20FL is significantly different from the conventional pneumatic tire in the following points. Specifically, the pneumatic tire 20FL has a plurality of air chambers therein along a width direction of the tread 21 (hereinafter appropriately abbreviated as the "tread width direction").

To be more specific, in a space inner than the sidewall 22A, partition parts 31A and 31B are disposed between the rim wheel 40 and an inner surface of the tread 21. Thus, a main air chamber C1, an outer sub-air chamber C1out and an inner sub-air chamber C2in are formed.

The partition parts 31A and 31B have an inner carcass 33 formed of the same material as that of the carcass 24. Moreover, at lower ends of the partition parts 31A and 31B, inner beads 32 are formed, which are locked by inner bead seats 42.

The main air chamber C1 is formed at a position including a tire equator line CL on the cross-section in the tread width direction.

The outer sub-air chamber C2out is positioned on a side outer than the main air chamber C1 in the vehicle width direction when the pneumatic tire is mounted on the four-wheel automobile 10. The inner sub-air chamber C2in is positioned on a side inner than the main air chamber C1 in the vehicle width direction when the pneumatic tire is mounted on the four-wheel automobile 10. Moreover, volumes of the outer sub-air chamber C2out and the inner sub-air chamber C2in are smaller than that of the main air chamber C1.

(Generation of Simulated Camber Thrust)

Here, brief description will be given of a mechanism for lateral force generation, attributable to rolling motion of the pneumatic tire 20FL, caused by differentiating internal pressures of the main air chamber C1, the outer sub-air chamber C2out and the inner sub-air chamber C2in, which are disposed in the pneumatic tire 20FL.

In the pneumatic tire 20FL, the main air chamber C1 mainly takes charge of part of belt tension on the belt layer 25. The outer sub-air chamber C2out and the inner sub-air chamber C2in mainly take charge of carcass tension on the carcass 24 in the sidewall 22A portion.

In this embodiment, by differentiating the internal pressures of the outer sub-air chamber C2out and the inner sub-air chamber C2in, the lateral force attributable to the rolling motion of the pneumatic tire 20FL is generated. Specifically, the lateral force is generated along a direction from the air chamber on the low pressure side to the air chamber on the high pressure side.

When there is a difference in internal pressure between the outer sub-air chamber C2out and the inner sub-air chamber C2in, tensile rigidity of the sidewall 22A and the partition part 31A, which are positioned on the outer side in the vehicle width direction, and that of the sidewall 22B and the partition part 31B, which are positioned on the inner side in the vehicle width direction, become asymmetrical about the tire equator line CL.

Thus, a ground contact pressure distribution in the pneumatic tire 20FL also becomes asymmetrical about the tire equator line CL. As a result, such lateral force is considered to be generated.

Specifically, the conventional pneumatic tire can also generate lateral force components such as ply steer force and conicity force. Meanwhile, the pneumatic tire 20FL can intentionally generate stronger lateral force by differentiating the internal pressures of the outer sub-air chamber C2out and the inner sub-air chamber C2in. In this embodiment, such lateral force will be hereinafter appropriately referred to as "simulated camber thrust".

(Functional Block Configuration of Pneumatic Tire Internal Pressure Control Device)

Figure 3:
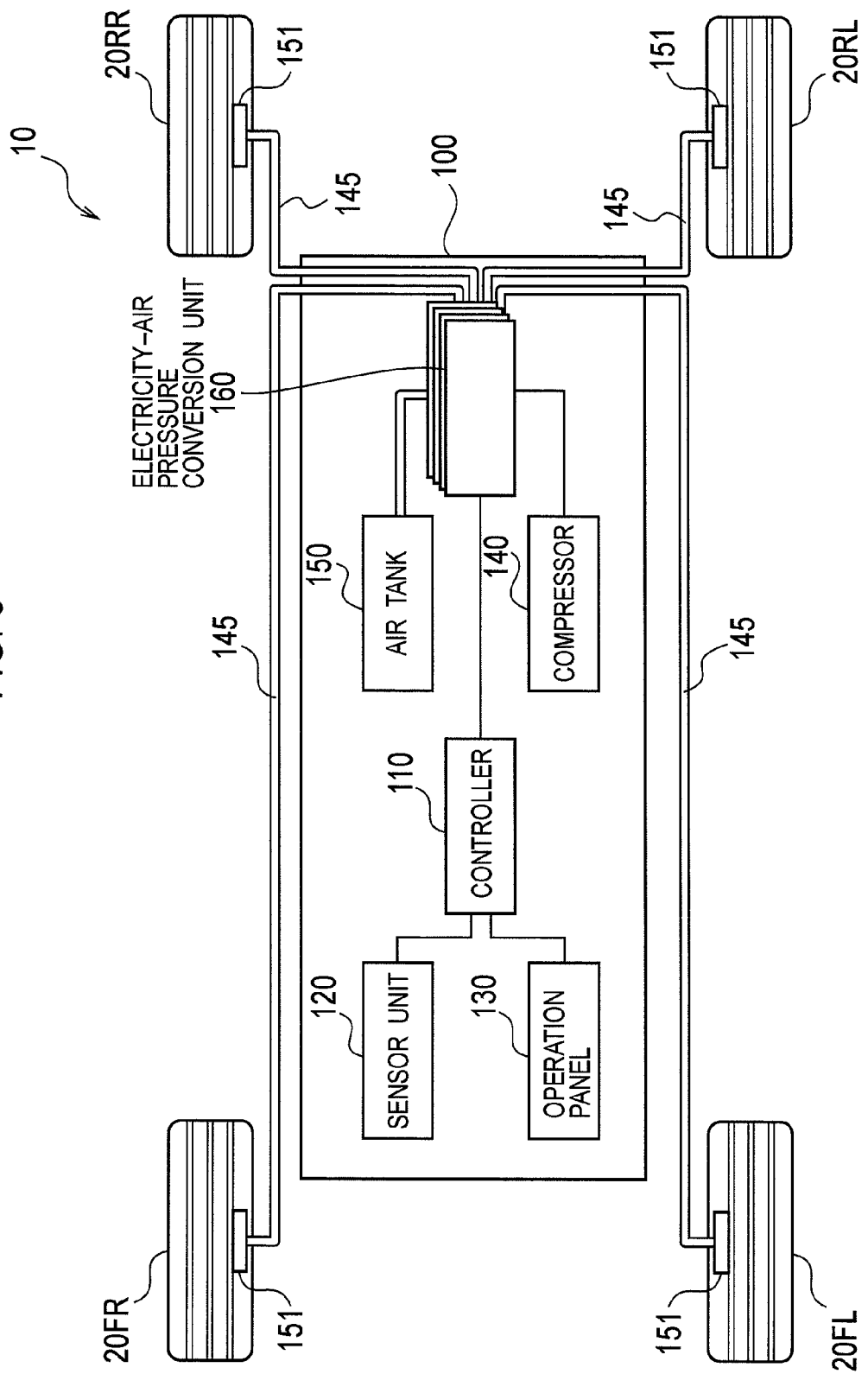
FIG. 3 is a functional block configuration diagram of a pneumatic tire internal pressure control device according to the embodiment of the present invention.

FIG. 3 is a functional block configuration diagram of the pneumatic tire internal pressure control device according to this embodiment.

The pneumatic tire 20FL is mounted at the front left position of the four-wheel automobile 10. The pneumatic tire 20FR is mounted at a front right position of the four-wheel automobile 10.

Moreover, the pneumatic tire 20RL is mounted at a rear left position of the four-wheel automobile 10. The pneumatic tire 20RR is mounted at a rear right position of the four-wheel automobile 10.

The pneumatic tire internal pressure control device 100 includes the controller 110, the sensor unit 120, the operation panel 130, the compressor 140, the air hoses 145, the air tank 150, the rotary joints 151 and an electricity-air pressure conversion unit 160.

The controller 110 controls the electricity-air pressure conversion unit 160 on the basis of signals outputted from an instruction unit, such as the sensor unit 120 and the operation panel 130, and from the electricity-air pressure conversion unit 160.

Specifically, the controller 110 differentiates the internal pressures of the main air chamber C1 and the outer sub-air chamber C2out or the inner sub-air chamber C2in, all of which are disposed in each of the pneumatic tires, on the basis of the signal (instruction) from the sensor unit 120 or the operation panel 130. Note that, in this embodiment, the controller 110 differentiates the internal pressures of the outer sub-air chamber C2out and the inner sub-air chamber C2in. In this embodiment, the controller 110 constitutes an internal pressure controller.

To be more specific, the controller 110 can differentiate the internal pressures of the outer sub-air chamber C2out and the inner sub-air chamber C2in on the basis of an operation executed on the operation panel 130 by the driver P.

Moreover, the controller 110 can generate a difference in internal pressure between the outer sub-air chamber C2out and the inner sub-air chamber C2in on the basis of a result of monitoring made by the sensor unit 120. Specifically, the controller 110 controls the internal pressure of each of the air chambers on the basis of a result of monitoring as to whether or not the four-wheel automobile 10 is running within a predetermined running lane (specifically, a running lane L3 shown in FIGS. 6 (a) and 6 (b)).

Furthermore, the controller 110 can generate a difference in internal pressure between the outer sub-air chamber C2out and the inner sub-air chamber C2in on the basis of a state related to steering detected by the sensor unit 120. Specifically, the controller 110 controls the internal pressure of each of the air chambers on the basis of a value of the steering angle that is the rotation angle of the steering wheel 30 or a yaw rate.

When changing the internal pressure of a specific air chamber, the controller 110 opens a valve (not shown), which is provided in the electricity-air pressure conversion unit 160, until a desired internal pressure is reached.

The sensor unit 120 is formed of various sensors for detecting that the four-wheel automobile 10 is going as being displaced in the leftward or rightward direction. In this embodiment, the sensor unit 120 constitutes the instruction unit configured to inform the controller 110 that the four-wheel automobile 10 is going as being displaced in the leftward or rightward direction.

Specifically, when the four-wheel automobile 10 has deviated or is going to deviate from the predetermined running lane (the running lane L3), the sensor unit 120 can monitor a deviation direction that indicates in which direction, leftward or rightward, the four-wheel automobile 10 has deviated or is going to deviate from the running lane. In this embodiment, the sensor unit 120 constitutes a running lane maintenance monitoring unit.

Note that means for detecting that the four-wheel automobile 10 has deviated or is going to deviate from the predetermined running lane (the running lane L3) can be formed by use of a heretofore known technology (for example, a technology using a CCD camera).

Moreover, the sensor unit 120 can detect a state related to steering of the four-wheel automobile 10. In this embodiment, the sensor unit 120 constitutes a steering state detection unit.

Specifically, the sensor unit 120 has a sensor for detecting the steering angle that is the rotation angle of the steering wheel 30. Moreover, the sensor unit 120 has a yaw rate sensor and can detect whether the four-wheel automobile 10 is in an oversteer state or an understeer state on the basis of the steering angle and an output signal from the yaw rate sensor, and the like.

The operation panel 130 constitutes the instruction unit configured to inform the controller 110 that the four-wheel automobile 10 is going as being displaced in the leftward or rightward direction.

Specifically, the operation panel 130 allows the driver P or the passenger to select in which direction, leftward or rightward, to run the four-wheel automobile 10. In this embodiment, the operation panel 130 constitutes a selection operation unit.

To be more specific, the operation panel 130 has "leftward direction" and "rightward direction" buttons. Moreover, the operation panel 130 has a button and the like for directly controlling the internal pressure value of each of the air chambers for each of the pneumatic tires. Note that the operation panel 130 can be formed of, for example, a liquid crystal display panel. The driver P selects desired control contents by touching an image of the button displayed on a screen.

The compressor 140 injects gas (compressed air) into the air tank 150. The gas stored in the air tank 150 is supplied to each of the pneumatic tires through the air hoses 145 and the rotary joints 151.

The air tank 150 stores the gas to be supplied to each of the pneumatic tires. The air tank 150 is connected to the air chambers in the pneumatic tires through the electricity-air pressure conversion unit 160, the air hoses 145 and the rotary joints 151.

The electricity-air pressure conversion unit 160 regulates a pressure of the gas to be supplied to each of the air chambers in the pneumatic tires. Moreover, the electricity-air pressure conversion unit 160 outputs to the controller 110 information indicating the pressure of the gas to be supplied to each of the air chambers in the pneumatic tires.

(Operations of Pneumatic Tire Internal Pressure Control Device)

Next, with reference to FIGS. 4 to 9, description will be given of operations of the pneumatic tire internal pressure control device in the four-wheel automobile 10 having the pneumatic tires 20FL, 20FR, 20RL and 20RR mounted thereon.

(1) Schematic Operations

Figure 4:
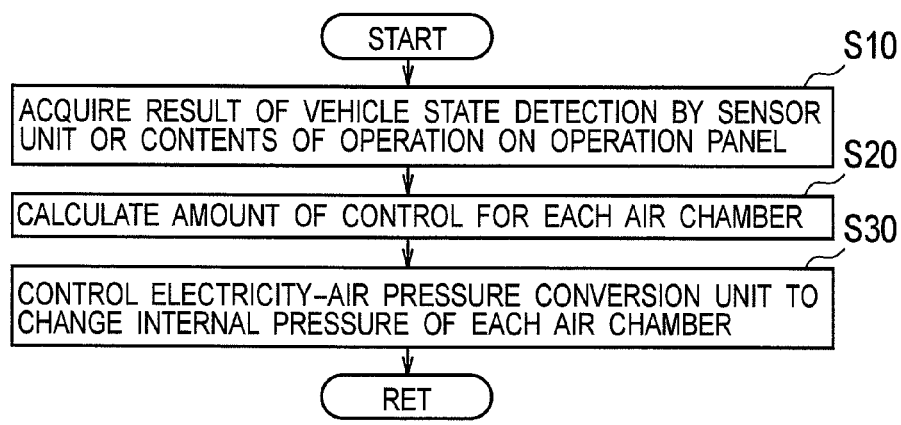
FIG. 4 is a flowchart schematically showing operations of the pneumatic tire internal pressure control device.

FIG. 4 is a flowchart schematically showing operations of the pneumatic tire internal pressure control device 100.

As shown in FIG. 4, in Step S10, the pneumatic tire internal pressure control device 100 acquires a result of detection of a state of the four-wheel automobile 10 (for example, whether or not the four-wheel automobile is running within the predetermined running lane), the detection being made by the sensor unit 120. Alternatively, in Step S10, the pneumatic tire internal pressure control device 100 acquires contents of an operation executed on the operation panel 130 by the driver P (for example, a request to go as being displaced in the rightward or leftward direction).

In Step S20, the pneumatic tire internal pressure control device 100 calculates a control amount of the internal pressure for each of the air chambers in the pneumatic tires on the basis of the acquired detection result or operation contents.

In Step S30, the pneumatic tire internal pressure control device 100 controls the electricity-air pressure conversion unit 160 on the basis of the calculated control amount to change the internal pressure of each of the air chambers.

(2) Control Based on Operation by the Driver

Figure 5:
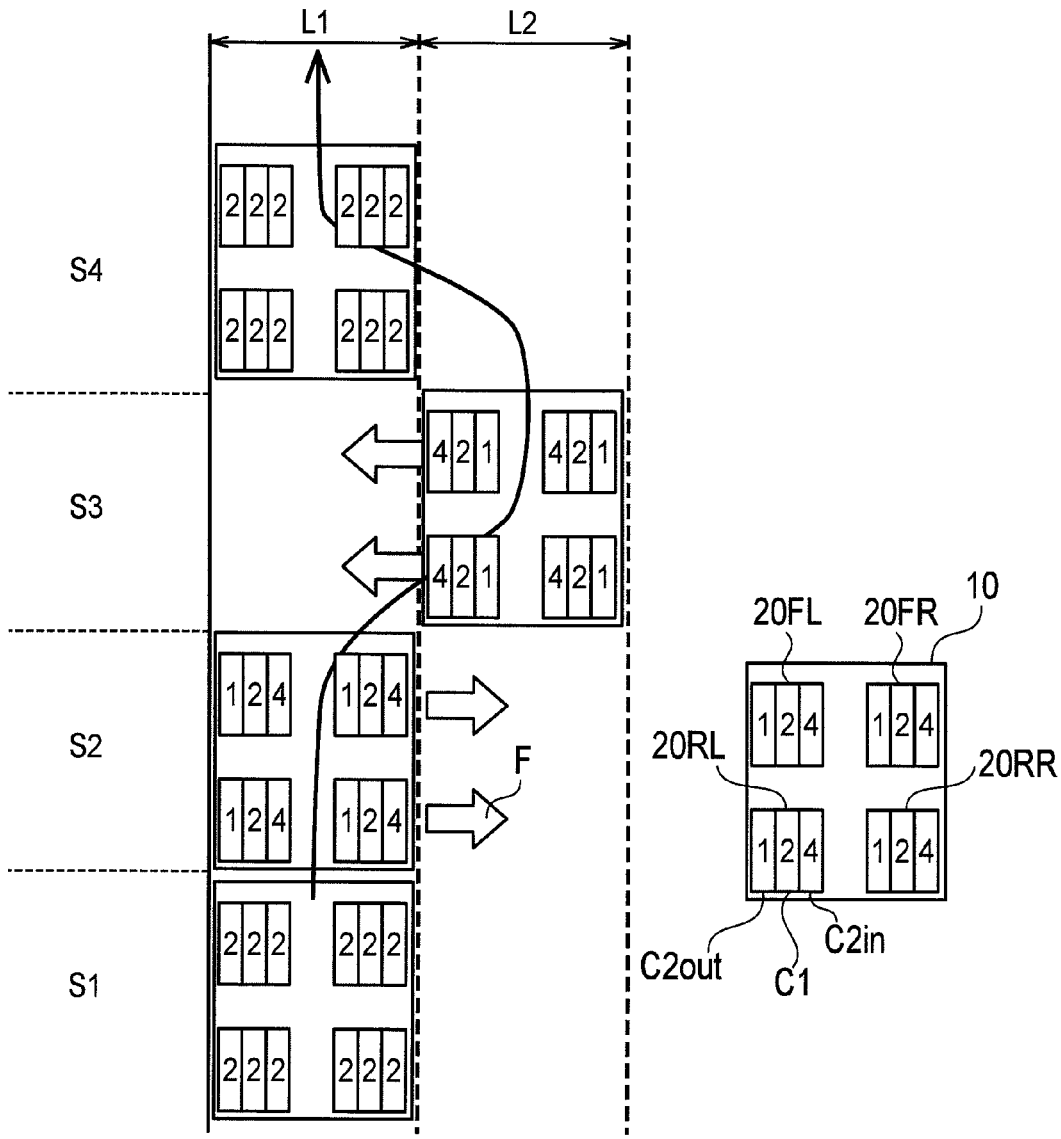
FIG. 5 is a view for explaining an example of control by the pneumatic tire internal pressure control device.

FIG. 5 is an explanatory view for explaining an example of control based on an operation by the driver P. As shown in FIG. 5, in a section S1, the four-wheel automobile 10 is running straight on a running lane L1.

Here, the driver P operates the operation panel 130 to make a request to go as being displaced in the "rightward direction". Upon the request to go as being displaced in the "rightward direction", the pneumatic tire internal pressure control device 100 controls the internal pressures of the pneumatic tires as shown in a section S2.

Specifically, the internal pressure of the air chamber positioned on the right side in the traveling direction of the four-wheel automobile 10 is set higher than that of the air chamber positioned on the side opposite thereto.

To be more specific, in each of the pneumatic tires 20FR and 20RR, the internal pressure ("4" in FIG. 5, hereinafter the same) of the outer sub-air chamber C2out is set higher than the internal pressure ("1") of the inner sub-air chamber C2in. Meanwhile, in each of the pneumatic tires 20FL and 20RL, the internal pressure ("4") of the inner sub-air chamber C2in is set higher than the internal pressure ("1") of the outer sub-air chamber C2out. Note that "1", "2" and "4" in FIG. 5 indicate that the larger the number, the higher the internal pressure.

When the internal pressures are controlled as described above, lateral force F (simulated camber thrust) is generated along a direction from the air chamber with the internal pressure "1" to the air chamber with the internal pressure "4". In other words, the lateral force F is generated toward the right side in the traveling direction of the four-wheel automobile 10.

As a result, the four-wheel automobile 10 moves from the running lane L1 to a running lane L2 even though the driver P is holding the steering wheel 30 in a straight traveling state.

Next, the driver P operates the operation panel 130 to make a request to go as being displaced in the "leftward direction". Upon the request to go as being displaced in the "leftward direction", the pneumatic tire internal pressure control device 100 controls the internal pressures of the pneumatic tires as shown in a section S3.

Specifically, the internal pressure of the air chamber positioned on the left side in the traveling direction of the four-wheel automobile 10 is set higher than that of the air chamber positioned on the side opposite thereto. As a result, as shown in a section S4, the four-wheel automobile 10 returns to the running lane L1 from the running lane L2.

After the four-wheel automobile 10 returns to the running lane L1, the driver P cancels the going as being displaced in the "leftward direction" by operating the operation panel 130. Then, as shown in the section S4, the respective air chambers are controlled to have approximately the same internal pressure ("2").

(3) Prevention of Deviation from Running Lane

Figure 6:
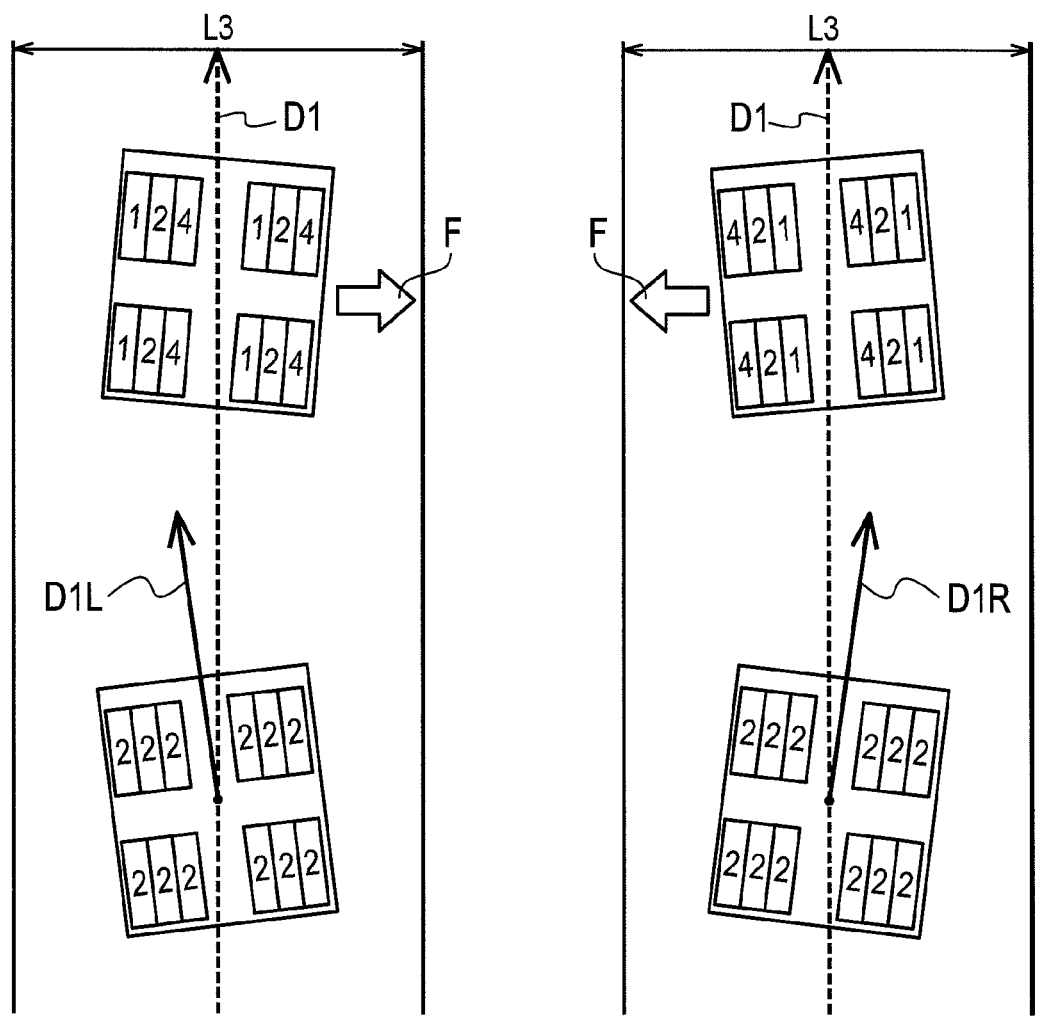
FIG. 6 (a) is a view for explaining an example of control by the pneumatic tire internal pressure control device, showing a controlled state of internal pressures in the case where the vehicle is going in a leftward direction D1L.

FIGS. 6 (a) and 6 (b) are explanatory views for explaining control of preventing the four-wheel automobile 10 from deviating from the running lane.

As shown in FIG. 6 (a), although the four-wheel automobile 10 is running on the running lane L3, the automobile is not running in a direction D1 along the running lane L3 but running in a direction D1L slightly tilted to the left. Note that the reason for the four-wheel automobile 10 running not in the direction D1 but in the direction D1L is inattentive driving or drowsy driving by the driver P.

When the four-wheel automobile 10 has deviated or is going to deviate from the running lane L3 (the predetermined running lane), the pneumatic tire internal pressure control device 100 (the sensor unit 120) monitors a deviation direction indicating in which direction, leftward or rightward, the four-wheel automobile 10 has deviated or is going to deviate from the running lane L3. Note that this monitoring can be executed on the basis of the heretofore known technology (for example, the technology using the CCD camera) as described above.

Next, the pneumatic tire internal pressure control device 100 (the controller 110) sets the internal pressure of the air chamber positioned on the side opposite to the deviation direction to be higher than that of the air chamber positioned on the deviation direction side in each of the pneumatic tires.

Specifically, as shown in FIG. 6 (a), in each of the pneumatic tires 20FR and 20RR, the internal pressure ("4") of the outer sub-air chamber C2out is set higher than the internal pressure ("1") of the inner sub-air chamber C2in. Meanwhile, in each of the pneumatic tires 20FL and 20RL, the internal pressure ("4") of the inner sub-air chamber C2in is set higher than the internal pressure ("1") of the outer sub-air chamber C2out.

When the internal pressures are controlled as described above, lateral force F (simulated camber thrust) is generated along a direction from the air chamber with the internal pressure "1" to the air chamber with the internal pressure "4". In other words, the lateral force F is generated toward the right side in the traveling direction of the four-wheel automobile 10.

As a result, the four-wheel automobile 10 can stay within the running lane L3 without the driver P's operation of the steering wheel 30.

Moreover, FIG. 6 (b) shows a controlled state of the internal pressures when the four-wheel automobile 10 is running in a direction D1R slightly tilted to the right. As shown in FIG. 6 (b), the internal pressure of the air chamber on the side opposite to that in the case of running in the direction D1L shown in FIG. 6 (a), specifically, the air chamber positioned on the left side in the traveling direction of the four-wheel automobile 10 is set higher than that of the air chamber positioned on the right side in the traveling direction.

When the internal pressures are controlled as described above, lateral force F is generated toward the left side in the traveling direction of the four-wheel automobile 10.

(4) Suppression of Oversteer State and Understeer State

Figure 7:
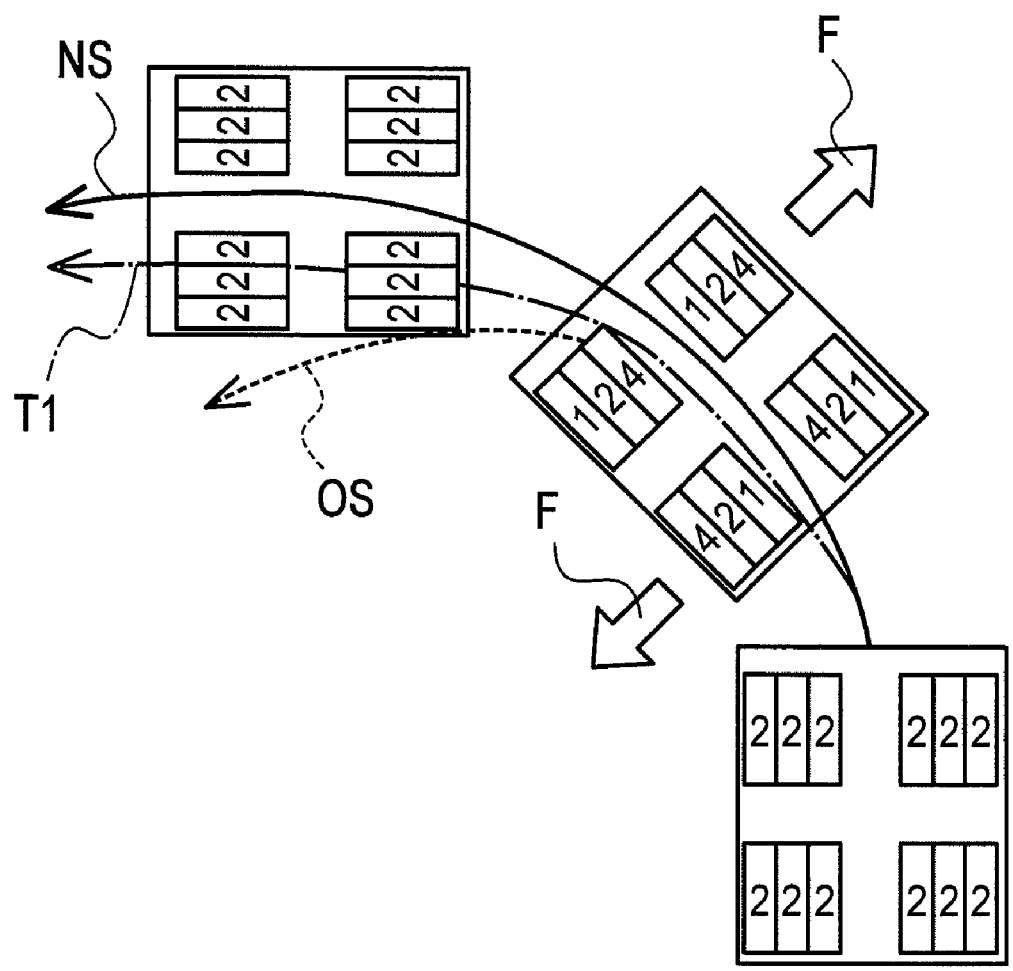
FIG. 7 is a view for explaining suppression of an oversteer state by the pneumatic tire internal pressure control device.
Figure 8:
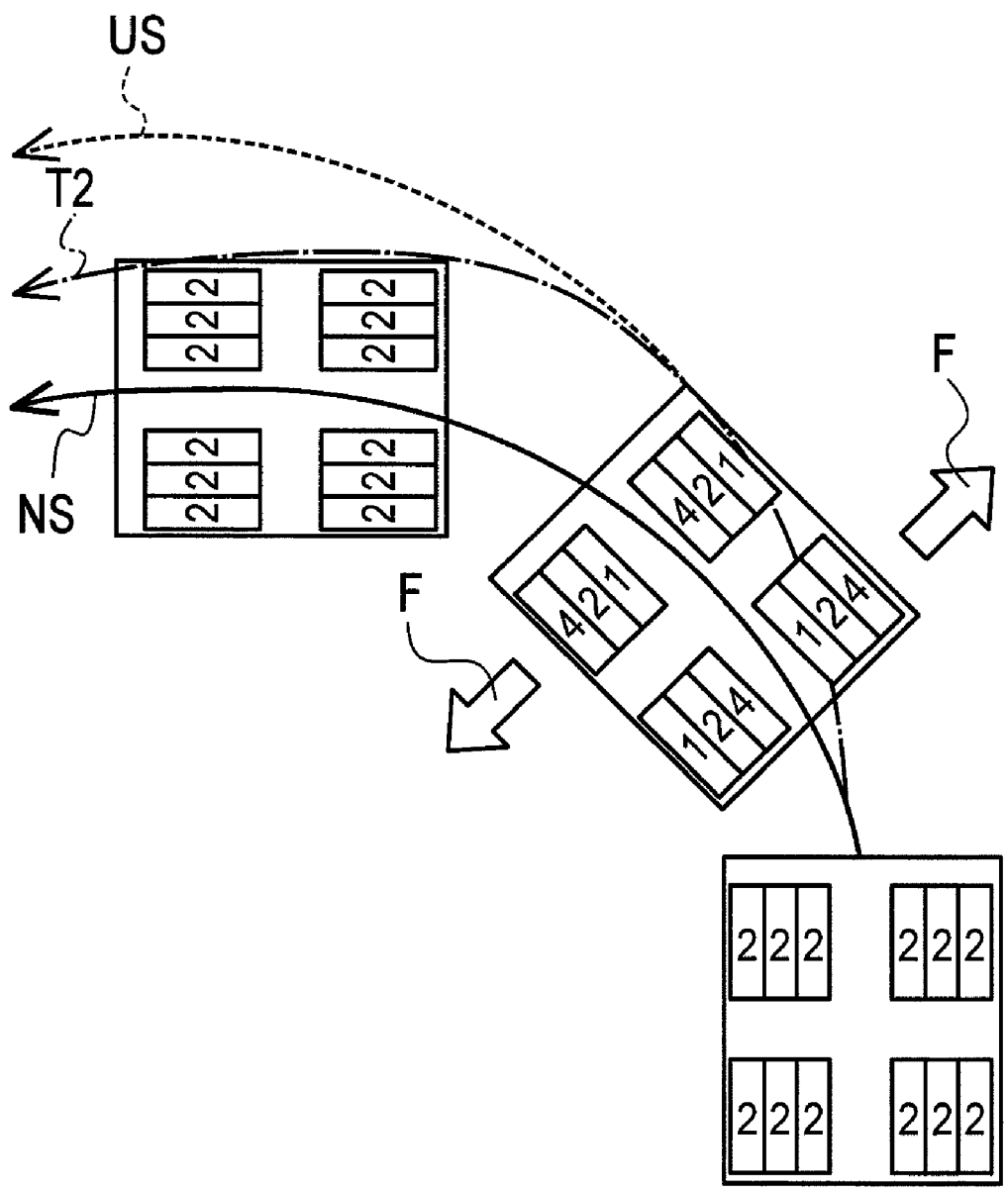
FIG. 8 is a view for explaining suppression of an understeer state by the pneumatic tire internal pressure control device.

FIGS. 7 and 8 are explanatory views for explaining controls of suppressing the oversteer state and the understeer state of the four-wheel automobile 10.

(4.1) Suppression of Oversteer State

FIG. 7 shows contents of control executed in the case of suppression of the oversteer state of the four-wheel automobile 10. The four-wheel automobile 10 is assumed to be cornering counterclockwise.

When the oversteer state occurs, the four-wheel automobile 10 tries to draw a trail (OS in FIG. 7) that winds inward compared with a neutral steering state (NS in FIG. 7).

The pneumatic tire internal pressure control device 100 (the sensor unit 120) detects that the four-wheel automobile 10 is in the oversteer state. Note that the oversteer state or the understeer state can be detected on the basis of the steering angle and the output signal from the yaw rate sensor, or the like, as described above.

When it is detected that the four-wheel automobile 10 is in the oversteer state, the pneumatic tire internal pressure control device 100 (the controller 110) sets the internal pressure of the air chamber positioned on the side opposite to a steering direction to be higher than that of the air chamber positioned on the steering direction side in each of the pneumatic tires 20FL and 20FR (front pneumatic tires) which are mounted on the front side of the four-wheel automobile 10.

Specifically, in the pneumatic tire 20FL, the internal pressure ("4") of the inner sub-air chamber C2in is set higher than the internal pressure ("1") of the outer sub-air chamber C2out. Moreover, in the pneumatic tire 20FR, the internal pressure ("4") of the outer sub-air chamber C2out is set higher than the internal pressure ("1") of the inner sub-air chamber C2in.

When the internal pressures are controlled as described above, lateral force F (simulated camber thrust) is generated toward the side opposite to the steering direction of the four-wheel automobile 10.

Moreover, the pneumatic tire internal pressure control device 100 (the controller 110) sets the internal pressure of the air chamber positioned on the steering direction side to be higher than that of the air chamber positioned on the side opposite to the steering direction in each of the pneumatic tires 20RL and 20RR (rear pneumatic tires) which are mounted on the rear side of the four-wheel automobile 10.

Specifically, in the pneumatic tire 20RL, the internal pressure ("4") of the outer sub-air chamber C2out is set higher than the internal pressure ("1") of the inner sub-air chamber C2in. Moreover, in the pneumatic tire 20RR, the internal pressure ("4") of the inner sub-air chamber C2in is set higher than the internal pressure ("1") of the outer sub-air chamber C2out.

When the internal pressures are controlled as described above, lateral force F (simulated camber thrust) is generated toward the steering direction side of the four-wheel automobile 10.

Specifically, in the pneumatic tires 20FL and 20FR, the lateral force F is generated toward the side opposite to the steering direction. Meanwhile, in the pneumatic tires 20RL and 20RR, the lateral force F is generated toward the steering direction side. Thus, the oversteer state of the four-wheel automobile 10 is suppressed. As a result, the four-wheel automobile 10 draws a trail T1 close to that in the neutral steering state (NS).

(4.2) Suppression of Understeer State

FIG. 8 shows contents of control executed in the case of suppression of the understeer state of the four-wheel automobile 10. In the control in the understeer state, control opposite to that in the oversteer state described above is executed. Thus, the control in the understeer state will be briefly described below.

When the understeer state occurs, the four-wheel automobile 10 tries to draw a trail (US in FIG. 8) that shifts outward compared with a neutral steering state (NS in FIG. 8).

As in the case of the oversteer state described above, the pneumatic tire internal pressure control device 100 (the sensor unit 120) detects that the four-wheel automobile 10 is in the understeer state.

The pneumatic tire internal pressure control device 100 (the controller 110) sets the internal pressure of the air chamber positioned on the steering direction side to be higher than that of the air chamber positioned on the side opposite to the steering direction in each of the pneumatic tires 20FL and 20FR (front pneumatic tires).

Moreover, the pneumatic tire internal pressure control device 100 (the controller 110) sets the internal pressure of the air chamber positioned on the side opposite to the steering direction to be higher than that of the air chamber positioned on the steering direction side in each of the pneumatic tires 20RL and 20RR.

When the internal pressures are controlled as described above, lateral force F (simulated camber thrust) is generated toward the steering direction side in the pneumatic tires 20FL and 20FR and lateral force F is generated toward the side opposite to the steering direction in the pneumatic tires 20RL and 20RR. Thus, the understeer state of the four-wheel automobile 10 is suppressed. As a result, the four-wheel automobile 10 draws a trail T2 close to that in the neutral steering state (NS).

(5) Reduction of Minimum Turning Radius

Figure 9:
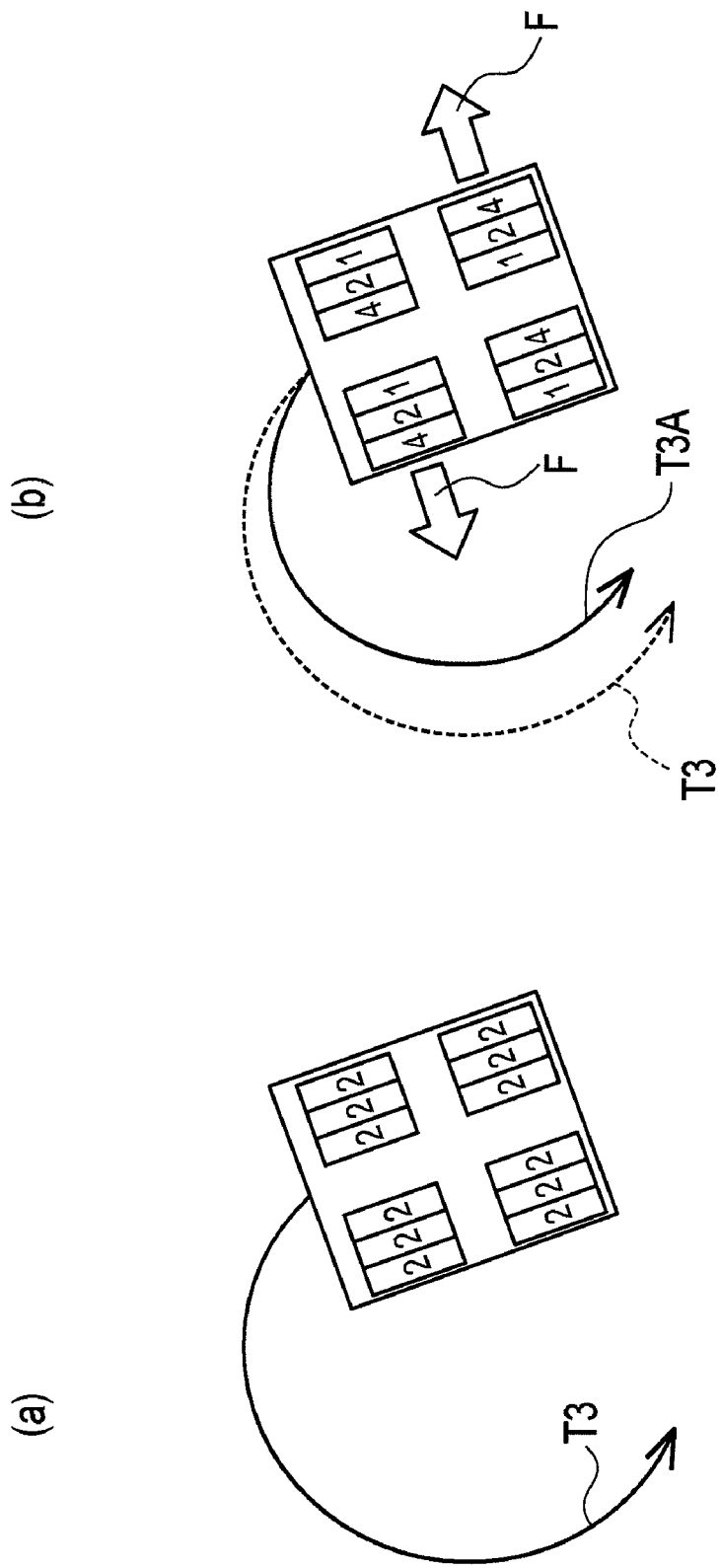
FIG. 9 (a) is an explanatory view for explaining an example of control by the pneumatic tire internal pressure control device, showing the case where the internal pressure of each air chamber is not controlled.

FIGS. 9 (a) and 9 (b) are explanatory views for explaining controls of reducing a minimum turning radius of the four-wheel automobile 10.

FIG. 9 (a) shows a trail T3 of the minimum turning radius, which is drawn by the four-wheel automobile 10, when the internal pressures of the respective air chambers are not controlled.

On the other hand, FIG. 9 (b) shows a trail T3A of the minimum turning radius, which is drawn by the four-wheel automobile 10, when the internal pressures of the respective air chambers are properly controlled.

Specifically, the pneumatic tire internal pressure control device 100 (the sensor unit 120) detects a steering direction of the four-wheel automobile 10.

Next, the pneumatic tire internal pressure control device 100 (the controller 110) sets the internal pressure of the air chamber positioned on the steering direction side to be higher than that of the air chamber positioned on the side opposite to the steering direction in each of the pneumatic tires 20FL and 20FR of the four-wheel automobile 10.

Moreover, the pneumatic tire internal pressure control device 100 (the controller 110) sets the internal pressure of the air chamber positioned on the side opposite to the steering direction to be higher than that of the air chamber positioned on the steering direction side in each of the pneumatic tires 20RL and 20RR.

Specifically, by executing the same control as the control of suppressing the understeer state described above (see FIG. 8), lateral force F (simulated camber thrust) as shown in FIG. 9 (b) is generated. Thus, the minimum turning radius of the four-wheel automobile 10 can be reduced.

Note that, in order to increase the turning radius of the four-wheel automobile 10 depending on the situation, the pneumatic tire internal pressure control device 100 (the controller 110) may set the internal pressure of the air chamber positioned on the steering direction side to be higher than that of the air chamber positioned on the side opposite to the steering direction in each of the pneumatic tires 20RL and 20RR.

(Comparative Evaluation)

Table 1 shows results of comparative evaluation using the pneumatic tire internal pressure control device 100 described above.

Specifically, Table 1 shows internal pressure values (unit: kPa) of the respective air chambers, which are set when the four-wheel automobile 10 is cornering counterclockwise as shown in FIGS. 7 and 8, and values obtained from feeling evaluation by a test driver.

TABLE 1

| | | Conventional Example | Comparative Example | Example 1 | Example 2 | Example 3 | Example 4 |
|---|---|---|---|---|---|---|---|
| Internal pressure Control | | Not Present | Not Present | Present | Present | Present | Present |
| Tire Structure | | 1 Air Chamber | 3 Air Chambers | 3 Air Chambers | 3 Air Chambers | 3 Air Chambers | 3 Air Chambers |
| FR Internal pressure | outer sub-air chamber (C2out) | | 200 | 100 | 100 | 100 | 100 |
| | main air chamber (C1) | 200 | 200 | 200 | 200 | 200 | 200 |
| | inner sub-air chamber (C2in) | | 200 | 300 | 300 | 300 | 300 |
| FL Internal pressure | outer sub-air chamber (C2out) | | 200 | 300 | 100 | 100 | 300 |
| | main air chamber (C1) | 200 | 200 | 200 | 200 | 200 | 200 |
| | inner sub-air chamber (C2in) | | 200 | 100 | 300 | 300 | 100 |
| RR Internal pressure | outer sub-air chamber (C2out) | | 200 | 100 | 100 | 100 | 300 |
| | main air chamber (C1) | 200 | 200 | 200 | 200 | 200 | 200 |
| | inner sub-air chamber (C2in) | | 200 | 300 | 300 | 400 | 100 |
| RL Internal pressure | outer sub-air chamber (C2out) | | 200 | 300 | 100 | 100 | 100 |
| | main air chamber (C1) | 200 | 200 | 200 | 200 | 200 | 200 |
| | inner sub-air chamber (C2in) | | 200 | 100 | 300 | 400 | 300 |
| Feeling Evaluation Index | | 100 | 100 | 107 | 105 | 108 | 103 |

Note that conditions and the like of the comparative evaluation are as follows.

Corner Radius: 50 m
Corner Entering Speed: 60 km/h to 80 km/h
Size of Tire Mounted: 225/55R17

Moreover, a reference internal pressure of each of the air chambers is set to 200 kPa and the internal pressures of the respective air chambers are instantly changed to the values shown in Table 1 immediately after start of steering for entering the corner.

As shown in Table 1, when the internal pressures of the respective air chambers are controlled (Examples 1 to 4), the feeling evaluation values are improved compared with the conventional example and the comparative example. Note that the feeling evaluation values are calculated with the feeling evaluation index of the pneumatic tire according to the conventional example as "100".

(Operations and Effects)

According to the pneumatic tire internal pressure control device described above, the internal pressures of the outer sub-air chamber C2out and the inner sub-air chamber C2in, which are disposed along the tread width direction, are controlled to be different from each other on the basis of the fact that the four-wheel automobile 10 is going as being displaced in the leftward or rightward direction.

When the pneumatic tires roll in the state where the internal pressures of the outer sub-air chamber C2out and the inner sub-air chamber C2in are different from each other, lateral force F (simulated camber thrust) is generated along a direction from the low-pressure air chamber side to the high-pressure air chamber side. Thus, the vehicle can be controlled to be displaced in the rightward or leftward direction.

Specifically, as described above, by operating the operation panel 130, the driver P can make the four-wheel automobile 10 go in an obliquely rightward direction or an obliquely leftward direction (for example, to change the lane), the four-wheel automobile 10 having the steering wheel 30 in the straight traveling state, without operating the steering wheel 30 at the driver P's will.

Moreover, the four-wheel automobile 10 can be prevented from deviating from the predetermined running lane and the oversteer state or the understeer state thereof can be suppressed. Furthermore, the minimum turning radius of the four-wheel automobile 10 can also be reduced.

Furthermore, each of the pneumatic tires has three air chambers disposed therein, including the main air chamber C1, the outer sub-air chamber C2out and the inner sub-air chamber C2in. Thus, the simulated camber thrust can be effectively generated while allowing the main air chamber C1 to support the load on the pneumatic tire.

Moreover, the volumes of the outer sub-air chamber C2out and the inner sub-air chamber C2in are smaller than that of the main air chamber C1. Thus, the internal pressures of the outer sub-air chamber C2out and the inner sub-air chamber C2in can be quickly changed to desired values. Specifically, a sufficient magnitude of simulated camber thrust required to control the four-wheel automobile 10 can be more quickly generated.

Other Embodiments

As described above, the contents of the present invention have been disclosed through one embodiment of the present invention. However, it should be understood that the present invention is not limited to the description and drawings which constitute a part of this disclosure. From this disclosure, various alternative embodiments, examples and operational technologies will become apparent to those skilled in the art.

For example, in the above embodiment, both of the front pneumatic tires and the rear pneumatic tires are set to be controlled. However, only one of the pneumatic tires (the front pneumatic tires or the rear pneumatic tires) may be set to be controlled. Furthermore, in order to effectively exert braking force or driving force of the pneumatic tires, the internal pressures of the main air chamber C1, the outer sub-air chamber C2out or the inner sub-air chamber C2in may be changed according to the running state (for example, in braking or accelerating) of the four-wheel automobile 10.

Moreover, the configuration of the pneumatic tire internal pressure control device 100 is an example and thus can be arbitrarily changed depending on the shape of the vehicle on which the device is mounted, the intended use thereof, and the like.

For example, a turbo charger rotated by the engine mounted on the four-wheel automobile 10 may be used to drive the compressor for pressure-feeding the gas into the pneumatic tires (air chambers). Furthermore, instead of the electricity-air pressure conversion unit 160, a pressure switch may be used.

Moreover, if quick internal pressure control is not required, the air tank 150 does not always have to be installed. Furthermore, when the internal pressures are lowered, the gas discharged from the pneumatic tires (air chambers) may be discharged into the atmosphere. Alternatively, the discharged gas may be returned to the air tank 150 and circulated within the pneumatic tire internal pressure control device 100. Moreover, instead of the gas (for example, air or nitrogen gas), a liquid may be pressure-fed into the pneumatic tires (air chambers).

Furthermore, the pneumatic tire internal pressure control device 100 may be miniaturized and mounted inside the rim wheel 40.

Moreover, in the above embodiment, the pneumatic tire having three air chambers disposed therein, including the main air chamber C1, the outer sub-air chamber C2out and the inner sub-air chamber C2in, is used. However, for example, a pneumatic tire having two or four air chambers disposed therein may also be used.

Furthermore, instead of the pneumatic tire used in this embodiment, a pneumatic tire having a plurality of air chambers in the tread 21 may also be used. Moreover, the air chambers may be formed of an open cell member having cells linked with other cells, such as chain foamed rubber. Alternatively, instead of the pneumatic tire used in this embodiment, a tire tube having a plurality of air chambers may be used.

Moreover, the internal pressures of the air chambers may be controlled on the basis of detection of disturbance to the pneumatic tire (for example, change in a contact state of the pneumatic tire).

As described above, the present invention includes various embodiments and the like which are not described herein, as a matter of course. Therefore, a technical scope of the present invention is defined only by items specific to the invention according to claims pertinent based on the foregoing description.

INDUSTRIAL APPLICABILITY

It is possible to provide a pneumatic tire control device and a method for controlling maneuverability of the vehicle by changing the internal pressures of the plurality of air chambers disposed along the tread width direction of the pneumatic tire.

The invention claimed is:

1. A pneumatic tire internal pressure control device for a vehicle, comprising:
pneumatic tires each having a plurality of air chambers disposed therein along a tread width direction;
an internal pressure controller configured to control internal pressures of the plurality of air chambers; and
an instruction unit configured to give the internal pressure controller an instruction to change the internal pressures on the basis of a running state of the vehicle, wherein
the instruction unit gives the internal pressure controller the instruction on the basis of a state where the vehicle is being displaced in a leftward or rightward direction,
the instruction unit includes a running lane maintenance monitoring unit configured to monitor whether or not the vehicle is running within a predetermined running lane, and
the instruction unit gives the internal pressure controller the instruction on the basis of a monitoring by the running lane maintenance monitoring unit.

2. The pneumatic tire internal pressure control device according to claim 1, wherein
the instruction unit includes a selection operation unit configured to allow a driver or a passenger of the vehicle to select the instruction, and gives the internal pressure controller the instruction on the basis of a selection by the selection operation unit.

3. The pneumatic tire internal pressure control device according to claim 1, wherein
the running lane maintenance monitoring unit monitors a deviation direction indicating in which direction, the leftward direction or the rightward direction, the vehicle deviates from the predetermined running lane when the vehicle has deviated or is going to deviate from the predetermined running lane, and
the internal pressure controller sets the internal pressure of the air chamber in each pneumatic tire positioned on the side opposite to the monitored deviation direction to be higher than the internal pressure of the air chamber in each pneumatic tire positioned on the deviation direction side.

4. The pneumatic tire internal pressure control device according to claim 1, wherein
the instruction unit includes a steering state detection unit configured to detect a state related to steering of the vehicle, and the internal pressure controller changes the internal pressures of the plurality of air chambers on the basis of the state related to steering.

5. The pneumatic tire internal pressure control device according to claim 4, wherein
the steering state detection unit detects a steering direction of the vehicle, and
the internal pressure controller sets the internal pressure of the air chamber positioned on the steering direction side to be higher than the internal pressure of the air chamber positioned on the side opposite to the steering direction in each of the pneumatic tires mounted on the front side of the vehicle.

6. The pneumatic tire internal pressure control device according to claim 4, wherein
the steering state detection unit detects a steering direction of the vehicle, and
the internal pressure controller generates a difference in internal pressure between the air chamber positioned on the steering direction side and the air chamber positioned on the side opposite to the steering direction in each of the pneumatic tires mounted on the rear side of the vehicle.

7. The pneumatic tire internal pressure control device according to claim 4, wherein
the steering state detection unit detects a steering direction of the vehicle, and
the internal pressure controller sets the internal pressure of the air chamber positioned on the side opposite to the steering direction to be higher than the internal pressure of the air chamber positioned on the steering direction side in each of rear pneumatic tires mounted on the rear side of the vehicle.

8. The pneumatic tire internal pressure control device according to claim 4, wherein
the steering state detection unit detects a steering direction of the vehicle, and
the internal pressure controller sets the internal pressure of the air chamber positioned on the steering direction side to be higher than the internal pressure of the air chamber positioned on the side opposite to the steering direction in each of rear pneumatic tires mounted on the rear side of the vehicle.

9. The pneumatic tire internal pressure control device according to claim 4, wherein
the steering state detection unit detects that the vehicle is in an oversteer state, and
the internal pressure controller sets the internal pressure of the air chamber positioned on the side opposite to the steering direction to be higher than the internal pressure of the air chamber positioned on the steering direction side in each of front pneumatic tires mounted on the front side of the vehicle.

10. The pneumatic tire internal pressure control device according to claim 4, wherein
the steering state detection unit detects that the vehicle is in an oversteer state, and
the internal pressure controller sets the internal pressure of the air chamber positioned on the steering direction side to be higher than the internal pressure of the air chamber positioned on the side opposite to the steering direction in each of rear pneumatic tires mounted on the rear side of the vehicle.

11. The pneumatic tire internal pressure control device according to claim 4, wherein
the steering state detection unit detects that the vehicle is in an understeer state, and
the internal pressure controller sets the internal pressure of the air chamber positioned on the steering direction side to be higher than the internal pressure of the air chamber positioned on the side opposite to the steering direction in each of front pneumatic tires mounted on the front side of the vehicle.

12. The pneumatic tire internal pressure control device according to claim 4, wherein
the steering state detection unit detects that the vehicle is in an understeer state, and
the internal pressure controller sets the internal pressure of the air chamber positioned on the side opposite to the steering direction to be higher than the internal pressure of the air chamber positioned on the steering direction side in each of rear pneumatic tires mounted on the rear side of the vehicle.

13. The pneumatic tire internal pressure control device according to claim 1, wherein
the plurality of air chambers disposed along the tread width direction include:

a main air chamber positioned so as to have a part of its outer periphery included on a tire equator line of the pneumatic tire, an outer sub-air chamber positioned more distant from the vehicle than the main air chamber, and an inner sub-air chamber positioned closer to the vehicle than the main air chamber.

14. The pneumatic tire internal pressure control device according to claim 13, wherein a volume of at least one of the outer sub-air chamber and the inner sub-air chamber is smaller than a volume of the main air chamber.

15. The pneumatic tire internal pressure control device according to claim 13, wherein the internal pressure controller generates a difference in internal pressure between the outer sub-air chamber and the inner sub-air chamber.

16. A vehicle comprising the pneumatic tire internal pressure control device according to claim 1.

17. A method for controlling internal pressures of pneumatic tires for a vehicle, the pneumatic tire having a plurality of air chambers disposed therein along a tread width direction, the method comprising the steps of:

instructing that the vehicle is being displaced in a leftward or rightward direction; and changing internal pressures of the plurality of air chambers on the basis of the instruction in the instructing step, the method further comprising:

monitoring whether or not the vehicle is running within a predetermined running lane, and changing the internal pressures of the plurality of air chambers on the basis of the monitoring of the vehicle.

* * * * *